United States Patent [19]
Harding

[11] 3,809,118

[45] May 7, 1974

[54] CONE DISK SPRING RELIEF VALVE

[75] Inventor: Ray S. Harding, Racine, Wis.

[73] Assignee: J. I. Case Company, Racine, Wis.

[22] Filed: July 19, 1973

[21] Appl. No.: 380,891

[52] U.S. Cl............................. 137/525, 251/DIG. 3
[51] Int. Cl............................................ F16k 15/14
[58] Field of Search................ 137/525; 251/DIG. 3

[56] References Cited
UNITED STATES PATENTS
3,717,178  2/1973  Allen ...................... 251/DIG. 3 X

*Primary Examiner*—William R. Cline
*Attorney, Agent, or Firm*—Arthur J. Hansmann

[57] ABSTRACT

A cone disk spring relief valve having two spaced-apart walls disposed within a housing containing a resilient cone-shaped member compressed between the walls. A fluid port is in flow communication with the hollow interior of the cone-shaped member, and fluid pressure on the interior of the member will cause the member to flex to allow the fluid to pass beyond the cone-shaped member and thereby the fluid is relieved. The housing walls are movable toward each other for compressing the cone-shaped member which has circular edges in fluid tight contact with the respective walls. Also, the housing has a fluid inlet port and a fluid outlet port which are aligned with each other for straight line flow of fluid through the valve, and the inlet port is in flow communication with the interior of the cone member, and the housing has connectors for moving one wall toward the other wall in compressing the cone-shaped member.

3 Claims, 3 Drawing Figures

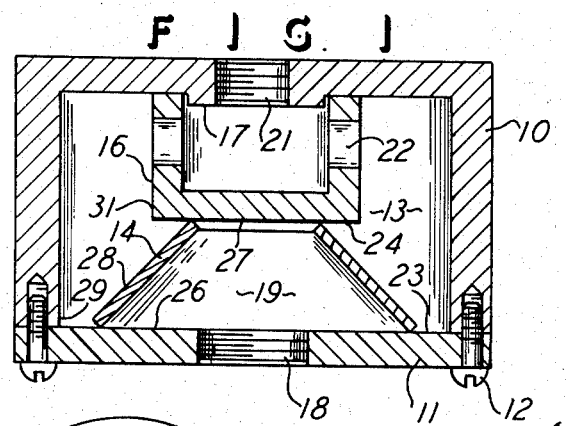
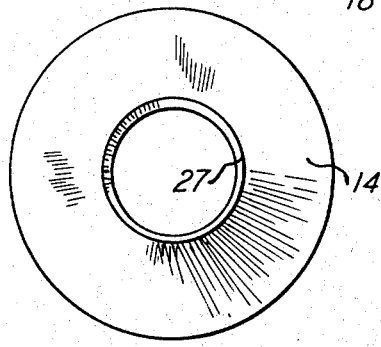
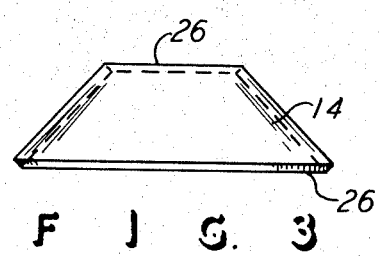

CONE DISK SPRING RELIEF VALVE

This invention relates to a cone disc spring relief valve of the type useful in service in a fluid line where it is desired that the fluid pressure be relieved in the event that it exceeds a maximum amount.

BACKGROUND OF THE INVENTION

Fluid relief valves are commonly known in the art, and they already exist in many different forms. Usually, a relief valve includes the three parts of a spring, a closure member, and a valve seat. Fluid pressure is directed against the closure member, and when it reaches a maximum amount, the closure is moved off its seat and against the force of the springs so that the fluid pressure can be relieved. This type of prior art relief valve therefore requires the three parts mentioned, namely, the spring, the closure, and the valve seat. These parts must be provided in sufficient refinement so that they serve the purpose, and they must also be maintained and positioned in proper alignment so that they can function to retain the fluid up to the maximum pressure desired, and so that the fluid can be released if the maximum pressure is exceeded.

Attempts have been made to provide a relief valve which does not require close tolerances for manufacturing, or which does not require the several parts described above. Such attempts are shown in U. S. Pat. Nos. 3,258,028, 3,356,100 and 3,646,957. However, the prior art relief valves do not achieve the objective of providing a relief valve which is inexpensive to manufacture, which is highly efficient in retaining the fluid up to the desired maximum pressure when the fluid is to be relieved, and which requires only a minimum of manufacturing attention and expense in the way of providing the several parts for this valve. Still further, the prior art relief valves do not function for the purpose of providing an in-line type of relief valve which can be inserted in a fluid pressure line so that the flow can continue in one line of direction, if desired.

Still further, the fluid pressure relief valve of this invention provides a structure which can be readily assembled and which retains its assembled position and retains the efficiency of holding the fluid up to the maximum pressure, all with only a minimum of attention in making the relief valve of this invention, and with relatively simple parts which are not difficult to make and which do retain their function for optimum efficiency.

In accomplishing the aforementioned objectives, the relief valve of this invention preferably utilizes a truncated cone member which is made of a resilient material and which presents a circular edge line on the opposite ends of the cone, and with the circular edge lines being in abutment with respective spaced-apart walls for effecting optimum fluid tightness between the edge lines and the respective walls, all without any special finish or treatment to the walls and to the cone member and without any special provisions for locating or supporting or providing co-operating parts with the cone member, other than the two walls mentioned.

Other objects and advantages will become apparent upon reading the following disclosure in light of the accompanying drawings.

BRIEF DESCRIPTION OF THE DRAWINGS

FIG. 1 is a sectional view taken along the axis of a relief valve showing one preferred embodiment of this invention.

FIG. 2 is a top plan view of the cone member shown in FIG. 1.

FIG. 3 is a side elevational view of the cone member of FIGS. 1 and 2.

DETAILED DESCRIPTION OF THE PREFERRED EMBODIMENT

FIG. 1 shows a housing 10 including a cover 11 secured thereto by screws 12. The housing presents an interior compartment 13 wherein there is disposed a truncated cone member 14 and an abutment member 16 piloted on a boss 17 on the interior of the housing 10. The housing cover 11 has a fluid inlet port 18 which is in full communication with the hollow interior 19 of the cone member 14. Also, the housing 10 has a fluid outlet port 21 which is in flow communication with passageways 22 in the support member 16. Therefore, it will be understood that a fluid line could be connected to the inlet port 18 for directing fluid to the hollow interior 19 of the cone 14. If, as described later, fluid passes beyond the cone member 14 and into the housing compartment 13, then the fluid can flow through the passageways 22 and out the outlet port 21. It will be further noted that the ports 18 and 21 are in line, so the entire relief valve shown in FIG. 1 can be disposed in a fluid pressure line, as might be desired.

The housing presents two spaced-apart and parallel walls 23 and 24 which are in fluid tight abutment with the opposite circle line edges 26 and 27, respectively, of the cone member 14. Thus the circular edges 26 and 27 bear against the respective walls or surfaces 23 and 24 to be fluid-tight therewith. By virtue of the line contacts provided by the circles 26 and 27 on the cone member 14, the cone member 14 can effect secure fluid-tight contact with the respective walls 23 and 24, and the parts need not be specially finished or constructed for the purpose described.

Also, the cone member 14 is made of a resilient material so that the conically shaped wall 28 of the cone member 14 is flexible and will distort in response to the maximum pressure of the fluid in the hollow interior 19. Of course upon distortion of the wall 28, the fluid can escape beyond the cone member 14 and pass into the housing chamber 13 and eventually through the outlet port 21, as desired. The cone member 14 is placed under compression by the walls 23 and 24, and this can be achieved by the securing of the cover 11 to the remainder of the housing 10 so that sufficient axial compression achieved relative to the cone member 14 to assure that the edges 26 and 27 will fluid tightly bear against the respective walls 23 and 24. Also, the outer circumference of the lower edge of the cone member 14, as seen in FIG. 1, is a lesser distance away from the housing wall 29 than is the upper edge 27 of the cone member 14 away from the outer edge 31 of the support abutment 16. That is, the housing interior wall 29 will restrain lateral movement of the member 14 to assure that the edge 27 will not move off the wall 24.

With this valve construction, the parts need not be expensive nor carefully manufactured, and the truncated cone member 14 can be adequately compressed between the wall 23 and 24, and the resiliency of the cone member 14 can be established so that the cone member wall 28 will flex to relieve pressure from the hollow interior 19 at the desired maximum fluid pressure. Of course it is preferable that the cone member 14 be of a metal material, and that it be sufficiently resilient for the retention of fluid up to the maximum pressure and that it flex for relieving the pressure and then so that it finally regains its original shape, such as the shape shown in FIG. 1, to again retain the fluid and prevent it from flowing into the housing compartment 13. Of course it will also be understood that if it were not desired to control or guide the escaping fluid, then the outlet port 21 would not be provided as shown and the escaping fluid might actually vent to the atmosphere, particularly if it be air that is being controlled. However, the arrangement of the port 18 and the wall 23 and the solid configuration of the wall 24, all as shown, is the construction of this invention. Further, the member 14 cannot shift laterally to uncover the inlet port 18, and yet no expensive or special parts and alignment arrangements are required in order to assure the fluid tight contact between the member 14 and the respective walls 23 and 24, as well as retaining the member 14 in alignment with the port 18 and the wall 24, as mentioned. It will be further understood that when the maximum pressure is reached at the interior 19 of the cone member 14, then the lower edge 26 will deflect to permit the pressure to be relieved as the fluid passes from the cone disc spring 14 and into the compartment 13.

What is claimed is:

1. A cone disk spring relief valve comprising a housing having two spaced-apart and parallel walls movable toward each other in the assembly of said housing, one of said walls having a port therein for the flow of fluid past said one wall, a hollow and truncated cone-shaped member of a spring material disposed in the space between said walls and with opposite axial ends of said member being in abutment with said walls and being pressed toward each other by the movement and positioning of said walls toward each other, the edge of the larger one of said axial ends of said member being disposed to fully encircle said port for blocking the flow of fluid past said larger end, the other of said walls being solid and free of any opening throughout the area encircled by the edge of the smaller of said axial ends of said member, and said member being resilient for flexing in response to fluid pressure at the hollow interior of said member and to thereby move said edge of said larger end off said one wall for the escape of fluid from said interior of said member.

2. The cone disk spring relief valve as claimed in claim 1, wherein said edges of said member are circular edges and each presents a circular line contact in respective abutment with said walls for being fluid tight with said walls.

3. The cone disk spring relief valve as claimed in claim 1, wherein said housing presents a compartment surrounding said member and has an additional fluid port for the flow of fluid out of said housing, and an abutment on said housing and disposed laterally of said member at a distance no greater than that required to restrain said member from shifting laterally for an amount which would have said larger end of said member uncover said port.

* * * * *